(No Model.)

D. SPRECHER.
NUT LOCK.

No. 250,763. Patented Dec. 13, 1881.

WITNESSES
Fred. G. Dieterich
Will R. Orndurff

INVENTOR
David Sprecher
Chas. J. Gooch
*Attorney*

N. PETERS, Photo-Lithographer, Washington, D. C.

UNITED STATES PATENT OFFICE.

DAVID SPRECHER, OF RICHVIEW, ILLINOIS, ASSIGNOR OF ONE-HALF TO ROBERT B. KEYES, OF SAME PLACE.

NUT-LOCK.

SPECIFICATION forming part of Letters Patent No. 250,763, dated December 13, 1881.

Application filed August 9, 1881. (No model.)

*To all whom it may concern:*

Be it known that I, DAVID SPRECHER, a citizen of the United States of America, residing at Richview, in the county of Washington and State of Illinois, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention consists in certain improved devices for securing nuts in position, as will be hereinafter described, and pointed out in the claim.

Figure 1:
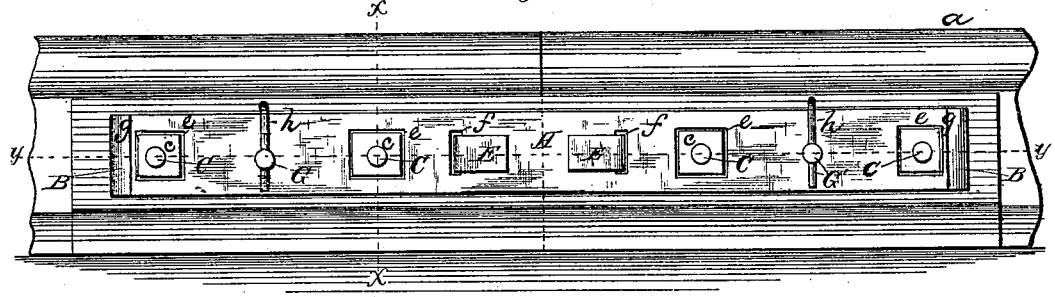
Figure 2:
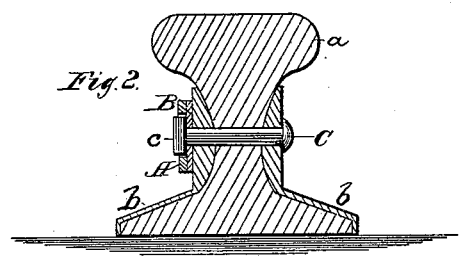
Figure 3:
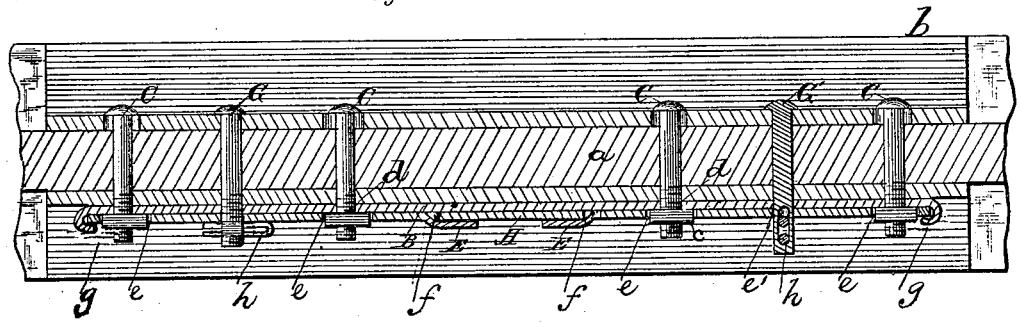

In the drawings, Figure 1 shows in elevation my improvements as applied to railway-rails. Fig. 2 is a vertical section thereof on the line $x$ $x$ of Fig. 1. Fig. 3 is a horizontal section on the line $y$ $y$ of Fig. 1.

$a$ represents a T or railway rail. $b$ $b$ are the chairs. C are the bolts, and $c$ the nuts, which are of usual construction, for securing the rails and chairs together.

B represents a plate, which is placed upon or against the rail, chair, or article to be secured. This plate has at suitable intervals bolt-holes $d$, through which the bolts C are passed, and lips or projections E E. The nuts $c$ are screwed firmly against the plate B, so as to hold it in position.

A represents the nut-locking plate. It is provided with holes $e$, corresponding in number to the number of bolts used, the holes $e$ being of suitable shape to admit of their passing over the nuts $c$ to prevent their turning.

$f$ $f$ represent slots formed within said plate A. Through these slots pass the lips or projections E on the plate B, said lips being bent down upon the plate A, as shown, so as to hold it securely in position. This plate A is still further secured in position by means of the ends $g$ of the plate B, which are turned inward and downward upon the ends of the plate A. If desired, the locking-plate A may be additionally secured by bolts G G, which are passed through holes $d$ and $e'$ in the chairs $b$ and rails $a$ or other article to be secured and the plates A and B, and are held in position by means of spring-keys $h$.

In operation the plate B is secured to the rail or other article to be secured by the bolts C and nuts $c$, the latter being screwed firmly down upon the plate B. Then the plate A is passed over the projecting bolts C, nuts $c$, and lugs or projections E. The holes $e$ are of a shape corresponding to the shape of the nuts, and are only just large enough to receive the same. Consequently so long as this plate A remains in position the nuts $c$ will be held from turning. The outwardly-extending lugs or projections E are then bent down and clamped firmly upon the outer face of the plate A, and the outer ends, $g$, of the plate B are bent over upon the outer ends of the plate A. The bolts G G, when such are used, are then passed through the rail or other article, $a$, and through the plates A B, and secured in position by spring-keys $h$, which are inserted within the slotted outer ends of said bolts G.

I prefer to form the lugs or projections E by striking the same up from or slitting the plate B and bending the slit portions up; and it is designed to form said plate B of some suitable metal that will allow of the ready bending without breaking of such parts. If desired, however, the portions E may be of more pliable material than that of which the plate B is constructed, in which event such portions E would be riveted or otherwise secured at one edge to the plate, so as to admit of the remaining portion being bent down upon the plate A after the slotted portions have passed over the projections E.

Although I have shown my improvement as applied to a railway-rail for the purpose of securing the nuts employed to hold the rails and chairs together, I wish it to be distinctly understood that I do not consider my invention limited in its application to such uses, as it is equally well adapted for application to machinery of all kinds and in other situations where bolts and nuts are employed for the purpose of retaining articles or parts of articles in position, and where it is desired to avoid the nuts becoming loose owing to the jarring of the machinery or other article to which they are applied.

I am aware that it is not new to provide a nut-locking device with a plate having returned ends adapted to clamp a nut-locking plate. I am also aware that another device has been provided with a plate having at one end an ear bent up from said plate and adapted to be bent down upon the locking-plate, and at the other end a slotted ear, through which a key is passed for the purpose of holding it to the nut-locking plate; and I am also aware that it is not new to provide nut-locking devices with slotted bolts, through which a spring-key is passed. I do not broadly claim such features; but,

Having thus described my invention, what I claim as new is—

In a nut-lock, jointly with the plate A, having the slots $f$ between its two ends, and suitable orifices to receive and hold the nuts, the plate B, having lips or projections E, adapted to pass through said slots $f$ and be bent over upon said plate A, and the returned ends $g$ for clasping the ends of said plate A, substantially as and for the purpose set forth.

In testimony whereof I affix my signature in presence of two witnesses.

DAVID SPRECHER.

Witnesses:
S. P. COOPER,
SAML. McDONNOL.